(12) United States Patent
Smith et al.

(10) Patent No.: US 9,779,394 B2
(45) Date of Patent: Oct. 3, 2017

(54) PROCESSING ANALYTICS DATA RECEIVED BY SENSOR DEVICES

(71) Applicant: Cellco Partnership, Basking Ridge, NJ (US)

(72) Inventors: Tracy J. Smith, Bothell, WA (US); Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 182 days.

(21) Appl. No.: 13/894,620

(22) Filed: May 15, 2013

(65) Prior Publication Data

US 2014/0344139 A1 Nov. 20, 2014

(51) Int. Cl.
*G06Q 40/00* (2012.01)
*G06Q 20/10* (2012.01)
*H04L 29/08* (2006.01)

(52) U.S. Cl.
CPC .............. *G06Q 20/10* (2013.01); *H04L 67/12* (2013.01)

(58) Field of Classification Search
CPC ........ G06Q 40/00; G06Q 30/02; G06Q 20/10; H04L 67/12
See application file for complete search history.

(56) References Cited

U.S. PATENT DOCUMENTS

| | | | | |
|---|---|---|---|---|
| 2003/0067897 A1* | 4/2003 | Black | ..................... | H04B 7/264 370/335 |
| 2005/0251326 A1* | 11/2005 | Reeves | ......................... | 701/200 |
| 2006/0074621 A1* | 4/2006 | Rachman | ......................... | 703/22 |
| 2006/0116899 A1* | 6/2006 | Lax | ......................... | G06Q 10/08 356/402 |
| 2009/0225683 A1* | 9/2009 | Collins | ................. | H04W 24/02 370/255 |
| 2009/0254971 A1* | 10/2009 | Herz et al. | ........................ | 726/1 |
| 2011/0118888 A1* | 5/2011 | White, II | ....................... | 700/293 |
| 2011/0131102 A1* | 6/2011 | Wang | .............................. | 705/16 |
| 2011/0202405 A1* | 8/2011 | Clark | ................. | G06Q 30/0251 705/14.49 |
| 2013/0132854 A1* | 5/2013 | Raleigh et al. | ................ | 715/738 |
| 2013/0265446 A1* | 10/2013 | Nicas | .................. | H04L 65/4076 348/207.1 |

FOREIGN PATENT DOCUMENTS

RU 2007/109153 * 9/2008 ............. H04L 12/14

OTHER PUBLICATIONS

Lee et al: "Joint Resource Allocation and Base-Station Assignment for the Downlink in CDMA Networks", IEEE/ACM Transactions on Networking, vol. 14, No. 1, Feb. 2006.*

* cited by examiner

*Primary Examiner* — Edward Baird (57) ABSTRACT

One or more devices may receive multiple data records from a sensor device when the sensor device receives an indication from a network device, associated with a service provider network, to provide the multiple data records via the service provider network. Each of the multiple data records may include analytics data collected by the sensor device. The one or more devices may store the multiple data records; receive, from a client device, a data request for one or more of the multiple data records meeting particular criteria; form, based on receiving the data request, processed data including the one or more of the multiple data records meeting the particular criteria; and provide the processed data to the client device.

20 Claims, 8 Drawing Sheets

Sensor Device Information
410

| Sensor ID | Location | Usage Information | User Information |
|---|---|---|---|
| Serial Number | GPS Coordinates | Product Information (model #, serial #, VIN #) | User Name |
| ICCID | Street Address | Traffic detection at location | User Address |
| MAC Address | | | User Profile |

Analytics Data
420

| Date/Time | Data class | Measurement |
|---|---|---|
| 1/1/2012 | Fluid Temperature | 10 Deg. C |
| 1/2/2012 | Water Pressure | 50 PSI |
| 1/3/2012 | Sales Price | $5.00 |
| 1/4/2012 | Battery Level | 20% |
| Date/Time | Class | Measurement |

PROCESSING ANALYTICS DATA RECEIVED BY SENSOR DEVICES

BACKGROUND

Analytics data is sometimes gathered to aid in an analysis. The quality of the analysis is often dependent on the amount of analytics data gathered and the ability to correlate the analytics data with conditions. That is, the quality of the analysis often suffers when insufficient analytics data is gathered. Also, gathering the analytics data can be costly and difficult to manage.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide one or more sensor devices to collect analytics data and provide the data to a centralized database (e.g., via a cellular network). For example, the one more sensor devices may be implemented in consumer devices (e.g., user devices, client devices, appliances, electronic devices, or the like), in sales systems, in metering systems (e.g., utility usage meters), in vehicles, at weather sites, and/or at some other location to collect the analytics data. In some implementations, the analytics data may be used to aid in an analysis (e.g., market research, such as a sales trend for particular merchandise, a failure trend for a particular consumer device, a driver's driving habits, etc.). In some implementations, the analytics data may be used to provide a user with alerts when criteria of the analytics data are met (e.g., an alert when the analytics data identifies an overheating component in a consumer device, a low battery in the consumer device, etc.)

Figure 1:
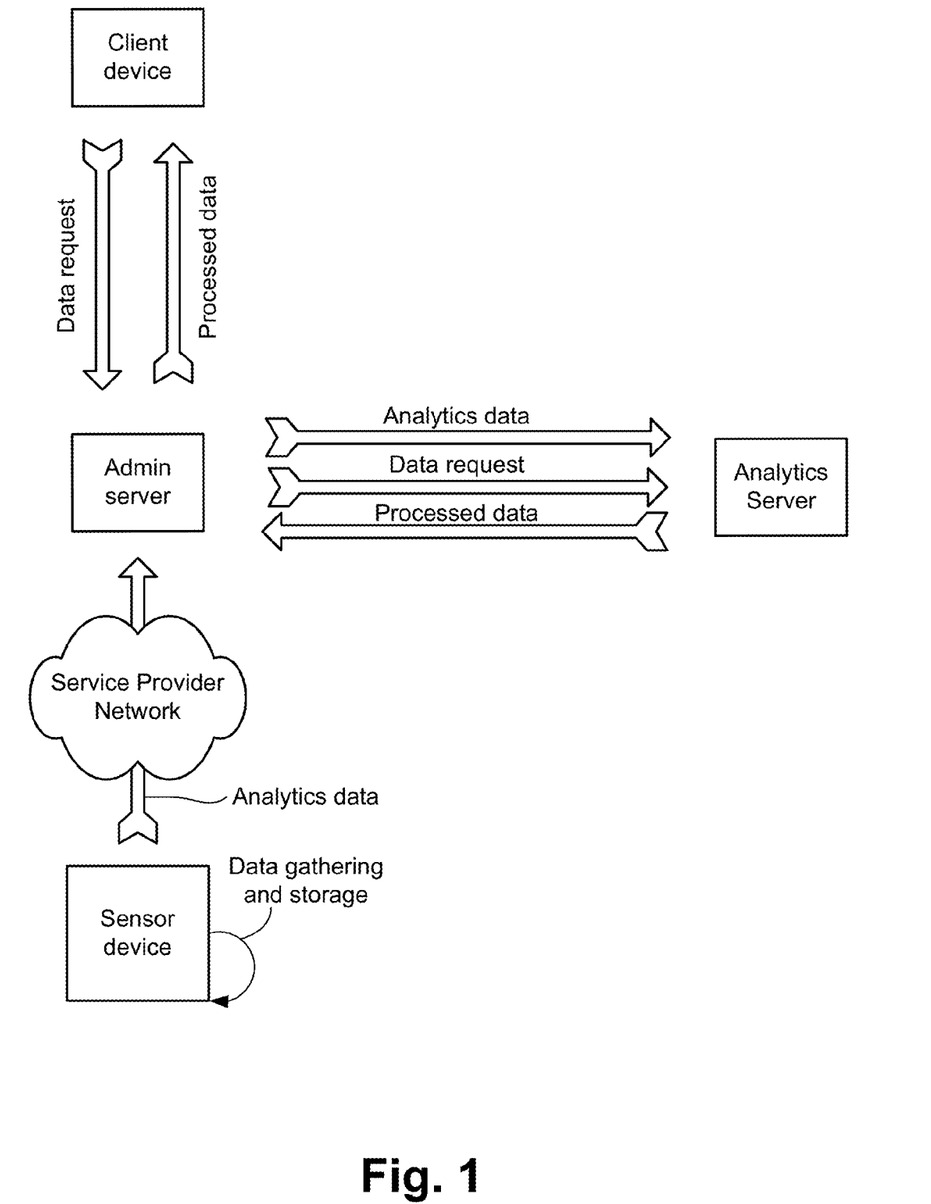
FIG. 1 illustrates an example overview of an implementation described herein.

FIG. 1 illustrates an example overview of an implementation described herein. As shown in FIG. 1, a sensor device may gather and store analytics data (e.g., data records), such as data records having information associated with the performance of a consumer good, information associated with a particular merchandise (e.g., sales related data), information associated with weather for a particular geographic location, information associated with pedestrian/vehicle traffic for a particular geographic location, etc. In some implementations, the sensor device may provide the analytics data to an administrative ("admin") server, for example, via a service provider network, such as a cellular network.

In some implementations, the analytics data may include a particular priority value that corresponds to a priority of the analytics data (e.g., the higher the value, the higher the priority). In some implementations, the sensor device may provide the analytics data to the admin server when network resources, reserved for data having the particular priority value as the analytics data, become available (e.g., to allow sufficient network resources to be allocated to higher priority data and/or to reduce costs by transmitting lower priority data at off-peak times).

As further shown in FIG. 1, the admin server may receive the analytics data and may provide the analytics data to an analytics server. In some implementations, a requester of processed analytics data may use a client device to provide a data request to the admin server. In some implementations, the data request may include criteria for data records that the requester wishes to receive. For example, the data request may include a request to receive data records gathered at a particular timeframe, data records relating to a particular product, data records relating to a particular geographic location, and/or data records meeting some other criteria.

As shown in FIG. 1, the admin server may provide the data request to the analytics server. In some implementations, the analytics server may process the data based on the criteria included in the data request and provide the processed data (e.g., a group of data records meeting the criteria) towards the client device. As shown in FIG. 1, the admin server may receive the processed data and provide the processed data to the client device. Additionally or alternatively, the analytics server may provide the processed data directly to the client device without involving the admin server. In some implementations, the processed data may be provided to the client device in exchange for a payment amount that may be based on the criteria.

As described above, the processed data may be used to aid the requester in an analysis, such as an analysis of failures of a particular product or system (e.g., when a temperature measurement of a component of the product exceeds a design threshold), an analysis of a driver's driving habits (e.g., based on velocity and acceleration measurements gathered by the sensor device implemented in a vehicle), an analysis of energy usage, and/or some other type of analysis.

As described above, the analytics data may include a particular priority value. For example, the analytics data may include a substantially low priority value such that the analytics data is provided to the admin server when network resources, for the priority value of the analytics data, is available. As a result, sufficient network resources may be allocated to higher priority data and cost may be reduced by providing the analytics data at off-peak times (e.g., when the network resources become available for transmission of the analytics data).

While the systems and/or methods describe the sensor device as providing analytics data via a service provider network, in practice, the sensor device may provide the analytics data via some other network.

Figure 2:
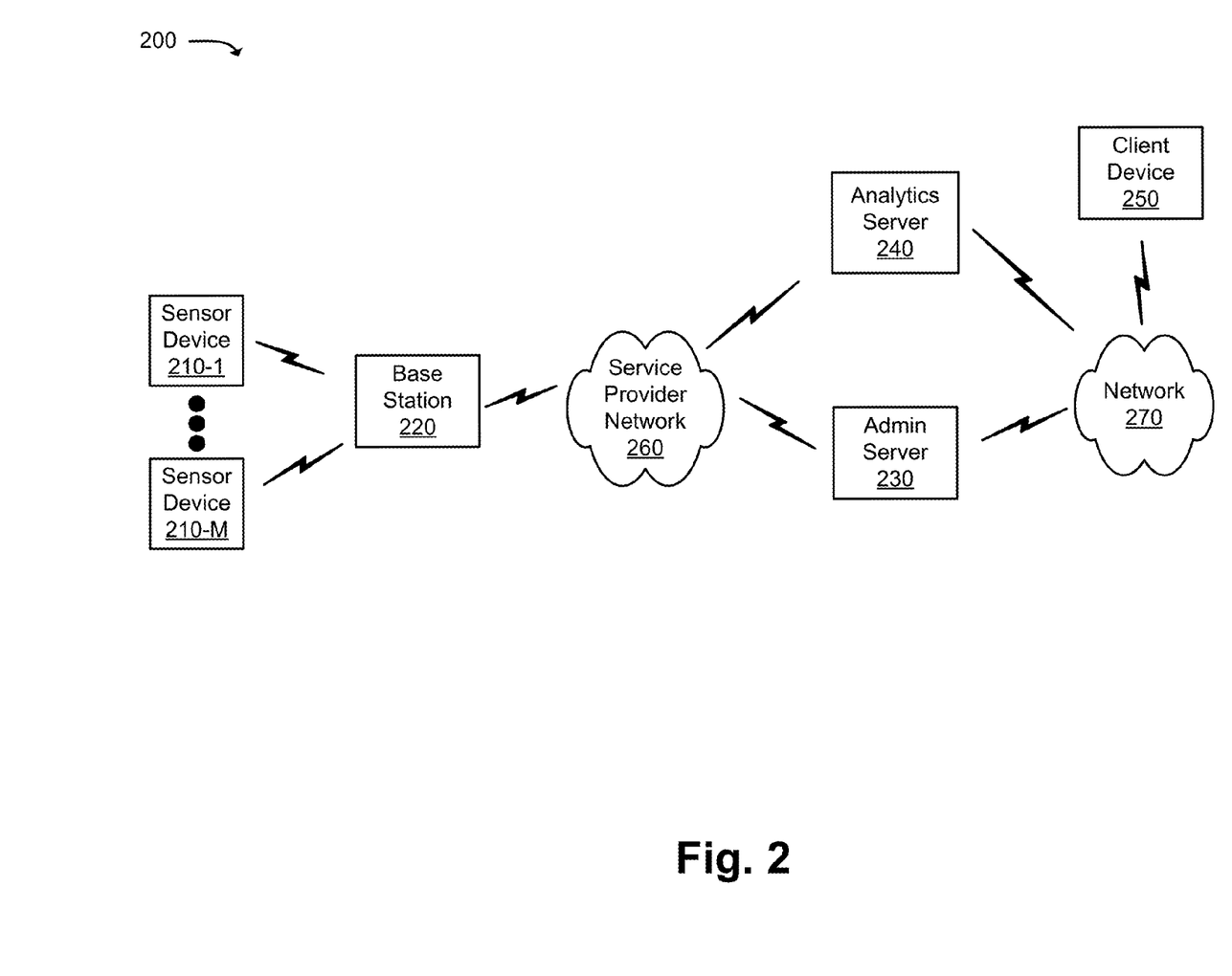
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include sensor devices 210-1, . . . , 210-M (where M≥1), base station 220, admin server 230, analytics server 240, client device 250, service provider network 260, and network 270.

Sensor device 210 may include one or more sensors that gather, store, and/or provide analytics data (e.g., to admin server 230 via service provider network 260). For example, sensor device 210 may include a temperature sensor, an accelerometer, a pressure sensor, a light sensor, an audio sensor, a Bluetooth radio, a near-field communications (NFC) radio, a battery level indicator, a fluid level sensor, a motion detector, a meter, an object or metal detection sensor (e.g., a Hall effect device), a geographic location device (e.g., a global positioning system (GPS) device), and/or some other type of sensing/data input device. In some implementations, sensor device 210 may gather analytics data continuously. In some implementations, sensor device 210 may gather analytics data at particular intervals (e.g., once a minute, once an hour, once a day, etc.).

In some implementations, sensor device 210 may include a controller having one or more ports to communicate with one or more sensor modules. In some implementations, sensor device 210 may be a mobile unit. For example, sensor device 210 may include a user device (e.g., a smart phone, a laptop, a tablet, and/or some other type of computing device) that includes one or more sensors. In some implementations, sensor device 210 may be a fixed unit that may be provided at a particular location or provided in a particular object or location (e.g., a consumer product, a vehicle diagnostic system, a merchant sales database, a facility, a utilities system, etc.).

Base station 220 may include one or more network devices that receive, process, and/or transmit traffic, such as audio, video, text, and/or other data, destined for and/or received from sensor device 210. In an example implementation, base station 220 may be an eNodeB (eNB) device and may be part of a cellular network. Base station 220 may receive traffic from and/or send traffic to network 270. Base station 220 may send traffic to and/or receive traffic from sensor device 210 via an air interface. One or more of base stations 220 may be associated with a radio access network (RAN).

In some implementations, base station 220 may provide an indication to sensor device 210 that identifies a priority value of data that may be provided via base station 220 (e.g., based on available network resources). In some implementations, sensor device 210 may provide analytics data when network resources, for the priority value of the analytics data, become available. Additionally or alternatively, admin server 230 may query base station 220 (e.g., at regular intervals, using a round-robin technique, etc.) to determine when network resources are available for sensor device 210 to provide the analytics data.

Admin server 230 may include a server device or a collection of server devices. In some implementations, admin server 230 may receive analytics data from sensor device 210 and may provide the analytics data to analytics server 240. In some implementations, admin server 230 may receive a data request from client device 250 (e.g., via a web portal, via a user interface, and/or via some other technique) and may provide the data request to analytics server 240. In some implementations, admin server 230 may collect payment information from client device 250 in exchange for processed data associated with the data request. In some implementations, admin server 230 may process the payment by charging an account based on the payment information. In some implementations, admin server 230 may provide a control instruction to sensor device 210. For example, admin server 230 may provide an activation/deactivation instruction, an instruction to modify a configuration of sensor device 210, an instruction to adjust a sensor or camera associated with sensor device 210, and/or some other type of instruction.

Analytics server 240 may include a server device or a collection of server devices. In some implementations, analytics server 240 may store analytics data based on receiving analytics data from admin server 230. Analytics server 240 may receive a request for analytics data and may process the analytics data based on criteria included in the data request. For example, analytics server 240 may identify data records that meet particular criteria associated with a data request. Some examples of processing analytics data are described below with respect to FIGS. 5-8.

Client device 250 may include a device capable of communicating via a network, such as network 270. For example, client device 250 may correspond to a mobile communication device (e.g., a smart phone or a personal digital assistant (PDA)), a portable computer device (e.g., a laptop or a tablet computer), a desktop computer, an augmented reality device, or another type of device. In some implementations, client device 250 may provide a data request with criteria to admin server 230 in order to receive processed data from analytics server 240. For example, a requester of processed data may use client device 250 to communicate with admin server 230 via a web portal, via a user interface, and/or via some other technique to provide the data request with the criteria. In some implementations, the requester may include an individual, an organization, a company, or the like that requests processed data (e.g., to aid the requester in an analysis and/or to provide the requester with an alert when a data record, meeting the criteria, is received by admin server 230). In some implementations, client device 250 may receive information regarding sensor device 210 (e.g., diagnostic data for troubleshooting, geographic location information to track a user of sensor device 210, etc.).

Service provider network 260 may include one or more wired and/or wireless networks via which user devices 220 communicate and/or receive content. For example, service provider network 260 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another type of network. Additionally, or alternatively, service provider network 260 may include a wide area network (WAN), a metropolitan area network (MAN), an ad hoc network, an intranet, a fiber optic-based network, and/or a combination of these or other types of networks.

Network 270 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
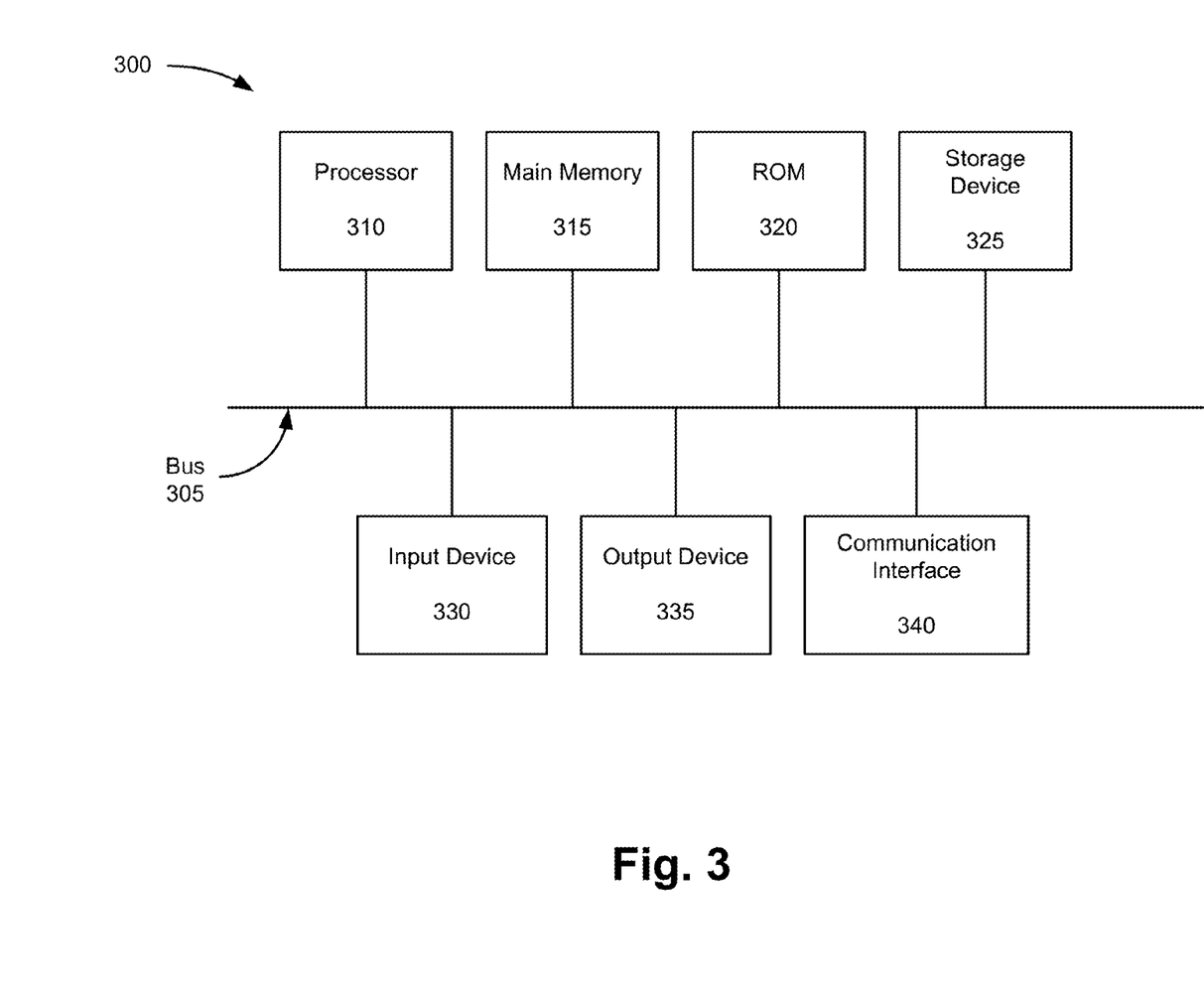
FIG. 3 illustrates example components of a device that may be used within the environment of FIG. 2.

FIG. 3 illustrates example components of a device 300 that may be used within environment 200 of FIG. 2. Device 300 may correspond to sensor device 210, base station 220, admin server 230, analytics server 240, and/or client device 250. Each of sensor device 210, base station 220, admin server 230, analytics server 240, and/or client device 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, a sensor, a camera, a microphone, a meter, or another type of input device. Output device 335 may include a component that outputs information to the operator, such as a light emitting diode (LED), a display, a speaker, or another type of output device. Communication interface 340 may include any transceiver-like component that enables device 300 to communicate with other devices or networks, such as service provider network 260 and/or network 270. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
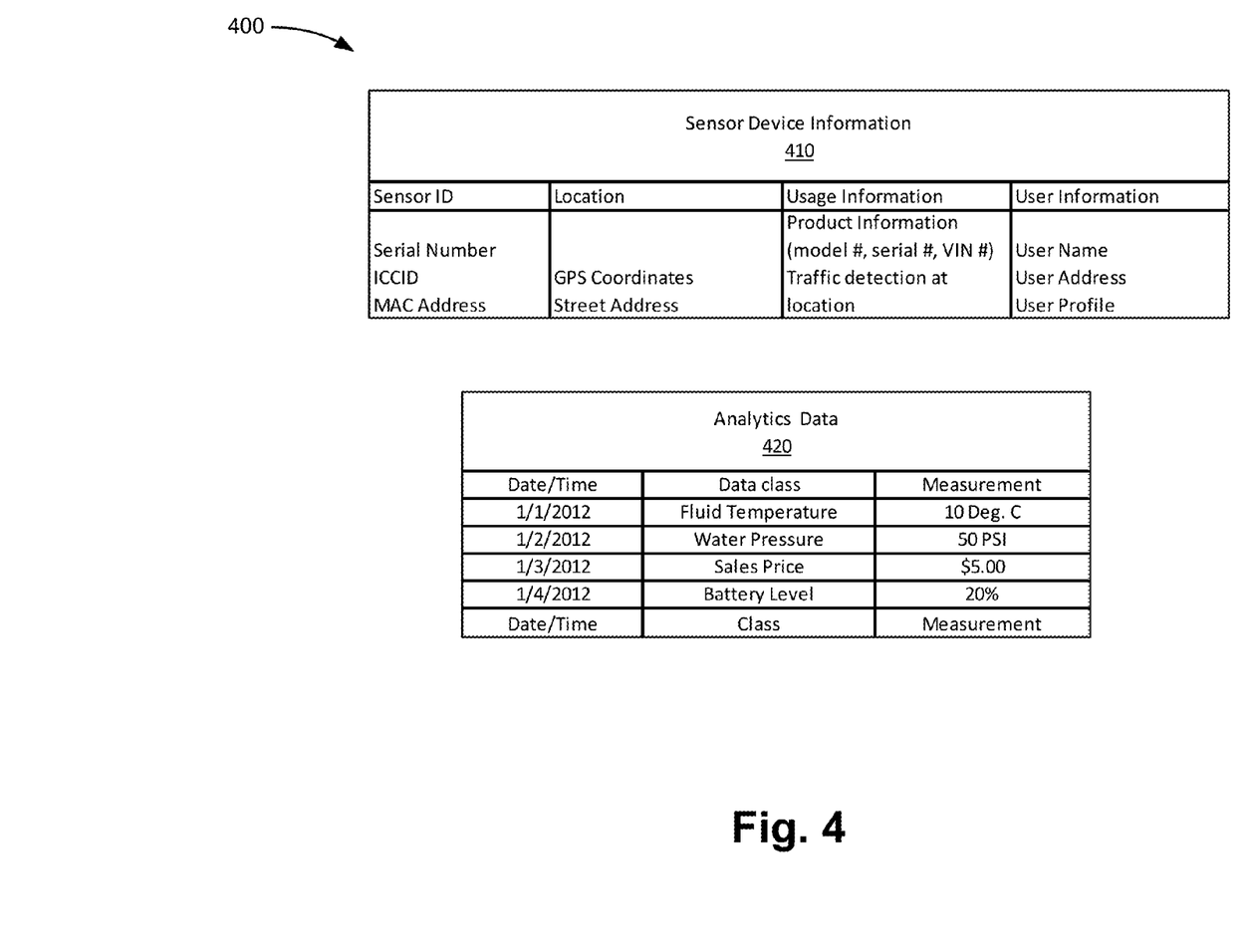
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of sensor device 210, admin server 230, and/or analytics server 240. In some implementations, data structure 400 may be stored in a memory separate from, but accessible by, sensor device 210, admin server 230, and/or analytics server 240. In some implementations, data structure 400 may be stored by some other device in environment 200, such as client device 250.

A particular instance of data structure 400 may contain different information and/or fields than another instance of data structure 400. In some implementations, a particular instance of data structure 400 may include information associated with a particular sensor device 210 and/or analytics data gathered by the particular sensor device 210. Another instance of data structure 400 may include information associated with another sensor device 210 and/or analytics data gathered by the other sensor device 210.

As shown in FIG. 4, data structure 400 may include sensor device information field 410 and analytics data field 420.

Sensor device information field 410 may include information to uniquely identify a particular sensor device 210. For example, sensor device information field 410 may include a serial number, an integrated circuit card identifier (ICCID), a media access control (MAC) address, a Bluetooth identifier, and/or some other information to identify the particular sensor device 210. In some implementations, sensor device information field 410 may store information identifying a location in which the particular sensor device 210 is implemented. For example, sensor device information field 410 may store information identifying GPS coordinates (e.g., longitude/latitude coordinates), a street address, or the like.

In some implementations, sensor device information field 410 may store information identifying usage information for sensor device 210 (e.g., how sensor device 210 is used). For example, sensor device information field 410 may store product information (e.g., a model number, a serial number, a vehicle identification number (VIN) etc.) for a product for which sensor device 210 gathers data (e.g., a vehicle, a consumer product, such as a user device, an appliance, etc.). Additionally or alternatively, sensor device information field 410 may store information to identify that sensor device 210 is implemented in a particular geographic location to gather traffic related data for the geographic location. Additionally or alternatively, sensor device information field 410 may store some other information to identify how sensor device 210 is being used. In some implementations, sensor device information field 410 may store information for a user of sensor device 210 (e.g., a user of a particular product including sensor device 210 and associated with the user). For example, sensor device information field 410 may store a name, an address, a profile, and/or some other information regarding the user.

Analytics data field 420 may include data records formed by sensor device 210 (e.g., when sensor device 210 gathers data). Each row in analytics data field 420 may correspond to a particular data record formed by sensor device 210. In some implementations, a data record may include a timestamp (e.g., a date/time) in which particular data was gathered, a class or type of data that was gathered (e.g., based on a type of sensor used to gather the particular data), a measurement value for the particular data, and/or some other information. For example, the data record may further include information stored by sensor device information field 410 (e.g., a sensor ID, location information for the particular data, product information for the particular data, etc.).

In some implementations, the measurement value may correspond to a measure of temperature, a measure of acceleration, a measure of fluid pressure, a measure of brightness, a measure of a battery level, a measure of usage time (e.g., a length of time that a particular sensor was activated), a measure of object presence (e.g., a number of objects detected by the sensor, etc.), a measure of Bluetooth signal presence, a measure of electrical power, a measure of energy consumption, a measure of motion, a measure of sales activity, and/or some other measurement value.

As an example, assume that sensor device 210 includes a fluid temperature measuring device. Further, assume that the fluid temperature measuring device determines that, at a particular date/time, the temperature of a fluid, in contact with the fluid temperature measuring device, was 10 degrees Celsius (C). Given these assumptions, analytics data field 420 may store a data record having a timestamp identifying the particular date/time, a data class type, such as "fluid temperature," and a measurement value of 10 degrees C.

In the above example, sensor device 210 may be implemented as part of a fluid temperature monitoring system, such as a monitoring system associated with a consumer appliance. For example, sensor device 210 may be implemented in a consumer dryer to monitor the air temperature of the dryer (e.g., such that a manufacturer of the dryer may identify the air temperature of the dryer to aid in a performance analysis). Additionally, or alternatively, sensor device 210 may be implemented as part of a fluid temperature monitoring system associated with a vehicle diagnostic system (e.g., to monitor a temperature of vehicle fluid, such as oil, coolant, or the like, in order to identify when a fluid exceeds a design threshold). Additionally, or alternatively, sensor device 210 may be implemented as part of a fluid temperature monitoring system associated with a merchant selling a particular beverage (e.g., to monitor a temperature of the beverage to aid a customer of the merchant in a purchasing decision regarding the beverage).

As another example, assume that sensor device 210 includes a water pressure measuring device. Further, assume that the water pressure measuring device determines that, at a particular date/time, the water pressure of a particular water supply in which sensor device 210 is implemented was 50 pounds per square inch (PSI). Given these assumptions, analytics data field 420 may store a timestamp identifying the particular date/time, a data class type, such as "water pressure," and a measurement value of 50 PSI. In the above example, sensor device 210 may be implemented as part of a water pressure measuring system, such as a monitoring system associated with a utility system and/or a water delivery system (e.g., to allow a managing party of the utility system and/or a water delivery system to identify trends in the water pressure and/or to identify instances when the water pressure is not within a design threshold).

In some implementations, analytics data field 420 may include a measurement of energy consumption (e.g., when sensor device 210 includes an energy consumption metering device), a measure of battery level (e.g., when sensor device 210 includes a battery consumption metering device), a measurement of sales prices of a product (e.g., when sensor device 210 includes, or is connected to, a sales processing system), an indication of objection detection (e.g., when sensor device 210 includes an object detector to detect objects, such as vehicles, individuals, etc.), and/or a some other information gathered by sensor device 210.

In some implementations, information stored by sensor device information field 410 and analytics data field 420 may be used to process analytics data gathered by sensor device 210. For example, a requester of the analytics data may use client device 250 to provide a request to receive data records meeting particular criteria, such as data records associated with a particular date/time, a particular geographic location, a particular product (e.g., as identified by a product model number, a VIN, etc.), and/or data records having a particular measurement value (e.g., a particular temperature value, accelerometer value, fluid pressure value, brightness value, battery level value, usage time value, object detection value, etc.). Some examples of providing data records based on a set of criteria are described below in FIG. 6-8.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
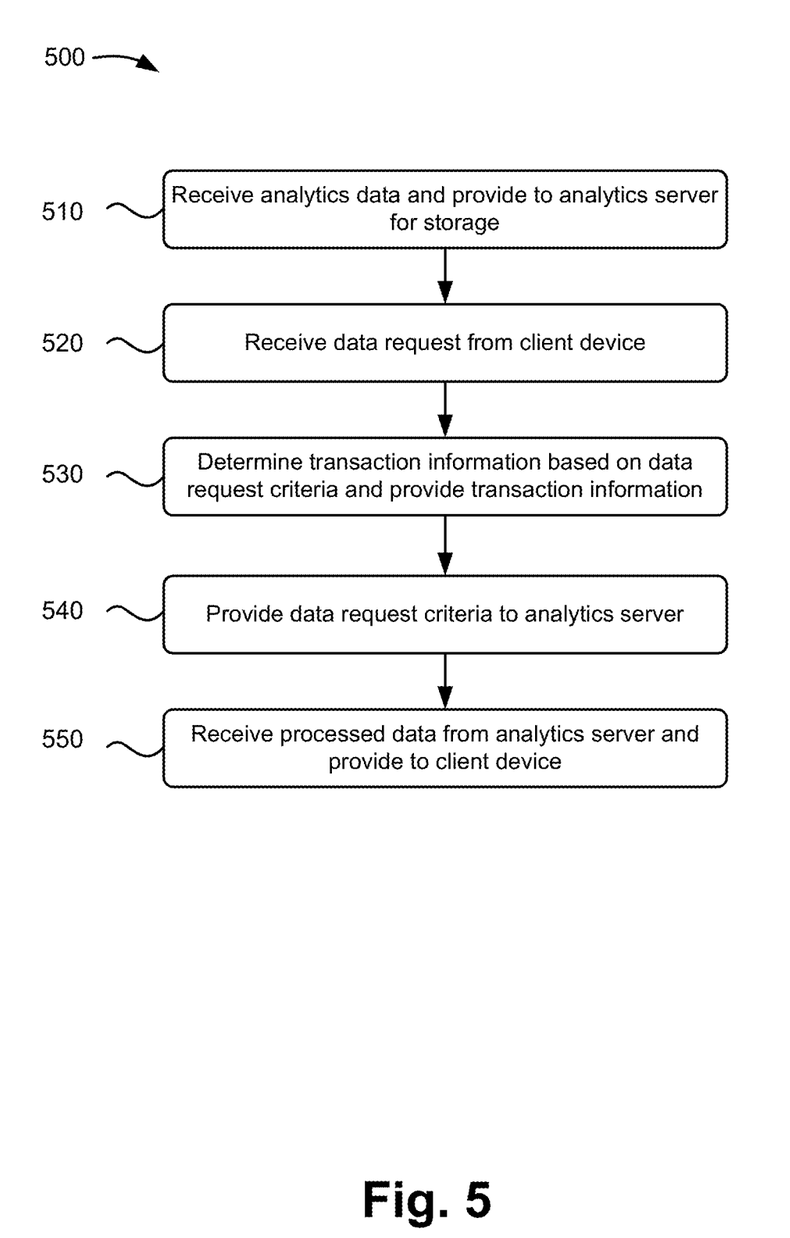
FIG. 5 illustrates a flowchart of an example process for managing analytics data and a request for processed data.

FIG. 5 illustrates a flowchart of an example process 500 for managing analytics data and a request for processed data. In some implementations, process 500 may be performed by one or more components of admin server 230. In some implementations, some or all of blocks of process 500 may be performed by one or more components of another device in environment 200 (e.g., analytics server 240) or a group of devices including or excluding admin server 230.

As shown in FIG. 5, process 500 may include receiving analytics data and providing the analytics data to an analytics server for storage (block 510). For example, admin server 230 may receive analytics data from sensor device 210. In some implementations, sensor device 210 may gather analytics data and may store the analytics data in a local storage associated with sensor device 210. In some implementations, sensor device 210 may provide the analytics data to admin server 230 (e.g., via service provider network 260) based on receiving an indication (e.g., from base station 220) that network resources are available for sensor device 210 to transmit the analytics data (e.g., based on a priority value of the analytics data). In some implementations, the analytics data may be real-time data (e.g., when network resources are available for sensor device 210 to transmit the analytics data) and/or historical data (e.g., when sensor device 210 transmits the analytics data a particular time after gathering the analytics data, such as when network resources are not readily available to transmit the analytics data).

Additionally, or alternatively, sensor device 210 may connect to a network device (e.g., a router, a gateway, a switch, or the like) to provide the analytics data to admin server 230 without involving base station 220 and/or service provider network 260. In some implementations, admin server 230 may provide the analytics data to analytics server 240 such that analytics server 240 may store the analytics data for processing.

Process 500 may also include receiving a data request from a client device (block 520). For example, admin server 230 may receive the data request from a requester of processed data via client device 250 (e.g., via a web portal, via a user interface, and/or via some other technique). In some implementations, the data request may include criteria that analytics server 240 may use to process analytics data stored by analytics server 240 (e.g., to identify data records meeting the criteria). For example, the criteria may include a timeframe in which data was gathered by sensor device 210 (e.g., based on a timestamp of a data record), product information associated with the data record (e.g., based on information stored by sensor device information field 410), and/or a measurement value (or range of values) associated with the data record.

In some implementations, the data request may include a request for a report of data records meeting the criteria. Additionally, or alternatively, the data request may include a request for an alert when a data record, meeting the criteria, is gathered. For example, data request may be a one-time request for a single alert or a single report of data records. Additionally, or alternatively, the data request may include a recurring request for multiple alerts each time a data record, meeting the criteria, is gathered. Additionally, or alternatively, the data request may include a recurring request for multiple reports of data records to be provided at recurring intervals (e.g., one report per day, per week, per month, etc.).

Process 500 may further include determining transaction information based on data request criteria and providing transaction information (block 530). For example, admin server 230 may determine the transaction information and may provide transaction information to client device 250. As described above, client device 250 may receive processed data (e.g., data records meeting the criteria) in exchange for a payment.

In some implementations, admin server 230 may determine an amount of the payment based on the criteria. For example, the payment amount may be proportional to a quantity of criteria included in the data request. Additionally, or alternatively, the payment amount may be based on particular criteria included in the data request. For example, the payment amount may vary when the particular criteria specifies data records associated with a particular product, a particular merchant, a particular class, a particular measurement value, etc. In some implementations, the criteria may be weighted in order to determine the payment amount. For example, data records, associated with merchant A may be different than data records associated with merchant B. In some implementations, the payment amount may be based on a time in which the processed data is requested. For example, the payment amount may be higher when processed data is requested during peak times of network traffic. In some implementations, the payment amount may be based on a requester of the processed data. For example, the payment amount may be different for requester A than for requester B. In some implementations a requester may sponsor or lease sensor device 210 in exchange for processed data associated with the sensor device 210.

In some implementations, admin server 230 may provide the transaction information to client device 250 and may receive, from client device 250, payment information (e.g., via a bill processing system associated with admin server 230) to charge an account associated with client device 250.

Process 500 may also include providing the data request to the analytics server (block 540). For example, admin server 230 may provide the data request to the analytics server based on receiving the data request from client device 250 and/or based on charging an account associated with client device 250. In some implementations, analytics server 240 may receive the data request and may identify data records meeting the criteria in the data request to form processed data. In some implementations, the processed data may include a report of data records meeting the criteria and/or an alert when sensor device 210 gathers a data record that meets the criteria. Some examples of identifying data records based on criteria are described below in FIGS. 6-8.

In some implementations, analytics server 240 may provide the processed data to admin server 230 and/or to client device 250.

Process 500 may further include receiving processed data from the analytics server and providing the processed data to the client device (block 550). For example, admin server 230 may receive the processed data from analytics server 240 when analytics server 240 forms the processed data as described above. In some implementations, block 550 may be omitted when analytics server 240 provides the processed data directly to client device 250. In some implementations, the processed data may be provided to client device 250 via a web portal, via e-mail, and/or via some other technique.

While a particular series of blocks has been described above with regard to FIG. 5, the operations, data flows, and/or the order of the blocks may be modified in other implementations. Further, non-dependent operations and/or data flows may be performed in parallel. In some implementations, block 530 may be provided after block 540. For example, the transaction information (e.g., the payment amount) may be based on a quantity of records that meet the criteria. Additionally, or alternatively, block 530 may be omitted in an implementation where client device 250 may receive processed data without providing payment information.

Figure 6:
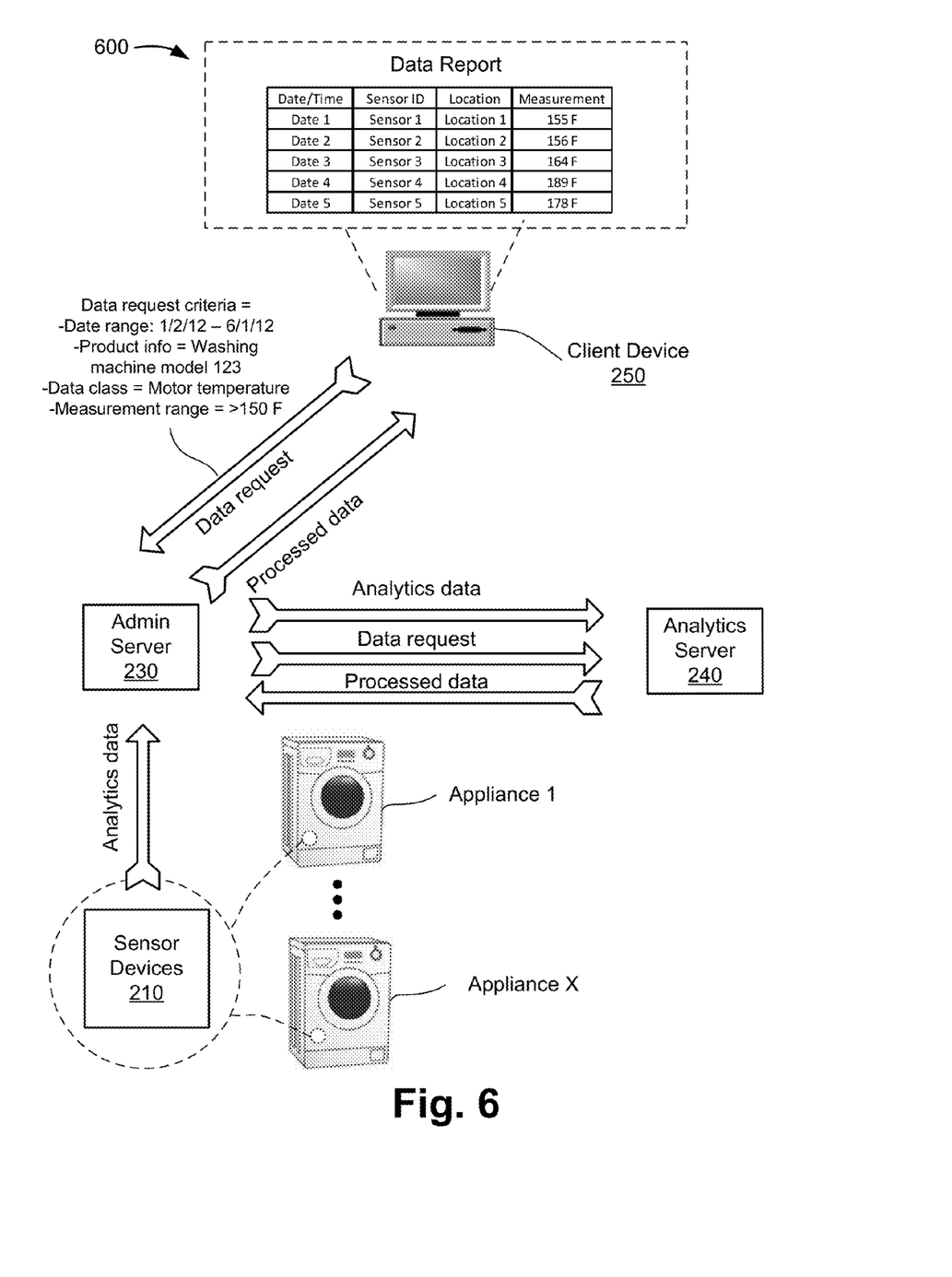
FIGS. 6-8 illustrate example implementations as described herein.

FIG. 6 illustrates an example implementation as described herein. In FIG. 6, assume that multiple sensor devices 210 are implemented within respective multiple appliances (e.g., washing machine appliances, such as appliance 1 through X, where X>1). Further, assume that each sensor device 210 includes a temperature measuring device to monitor a temperature of a motor included within each corresponding appliance. Further, assume that sensor devices 210 provide analytics data (e.g., data records with temperature information) to admin server 230.

As shown in FIG. 6, admin server 230 may provide the analytics data to analytics server 240 (e.g., for storage by analytics server 240). In some implementations, client device 250 may provide a data request to admin server 230 to request a report identifying data records that meet particular criteria. For example, assume that a user of client device 250 wishes to receive data records meeting particular criteria, such as data records that were gathered during the date range of Jan. 2, 2012-Jun. 1, 2012, data records associated with a model number of machines 1 through X (e.g., washing machine model 123), data records associated with a motor temperature class type, and data records associated with a value range of greater than 150 degrees Fahrenheit (F). Given this assumption, the user may input, to client device 250, the particular criteria and may direct client device 250 to provide a data request including the particular criteria to admin server 230. For example, the user may use client device 250 to access a web portal in order to input the particular criteria and to provide the particular criteria to admin server 230.

In some implementations, admin server 230 may receive the data request and may provide the data request to analytics server 240 (e.g., based on receiving payment information from client device 250 if payment is required). As shown in FIG. 6, analytics server 240 may receive the data request and may identify data records, associated with analytics data gathered by sensor device 210 and stored by analytics server 240, that meet the criteria associated with the data request. In the example of FIG. 6, analytics server 240 may perform a cross-reference search function to identify data records that were gathered within the date range of Jan. 2, 2012-Jun. 1, 2012, data records associated with the model number washing machine model 123, data records associated with the motor temperature class type, and data record associated with the measurement range of greater than 150 degrees F. (e.g., a threshold temperature that may indicate a defective motor when the threshold is exceeded).

In some implementations, analytics server 240 may identify the data records that meet the criteria to form processed data that includes a report of the identified records. As shown in FIG. 6, analytics server 240 may provide the processed data to client device 250 (e.g., directly to client device 250 or via admin server 230). In some implementations, client device 250 may display a report, corresponding to the processed data, on a display of client device 250. As shown in interface 600 of client device 250, the report may include a list of data records meeting the criteria. In some implementations, the data records may include a timestamp, a sensor ID (e.g., to identify a particular sensor 210 that formed the data record), a location in which the data was gathered, a measurement gathered by the particular sensor device 210), a shipping batch number, and/or some other information.

In some implementations, the report may aid in an analysis, such as a failure analysis for the appliance. As an example, assume that the threshold temperature of 150 degrees F. is indicative of a defective motor. Given this assumption, the report may identify particular appliances that exceeded this threshold. Further, the report may identify conditions in which the temperature exceeded the threshold (e.g., a geographic location, a shipment batch number, etc.). For example, assume that the report includes multiple data records associated with the same shipment batch number. Given this assumption, the report may be used to identify a particular shipment in which appliances were shipped with a defective motor (e.g., to issue a recall on the appliances and/or to provide service to the appliances). Further, the data record may include information identifying a customer (e.g., name/address information) of a defective appliance to notify the customer of the defective appliance.

While a particular example is shown in FIG. 6, it will be apparent that the above description is merely an example implementation. Other examples are possible and may vary from what is shown and described with respect to FIG. 6. For example, in practice, the report shown in interface 600 may include additional information, less information, or differently arranged information than what is shown.

Figure 7:
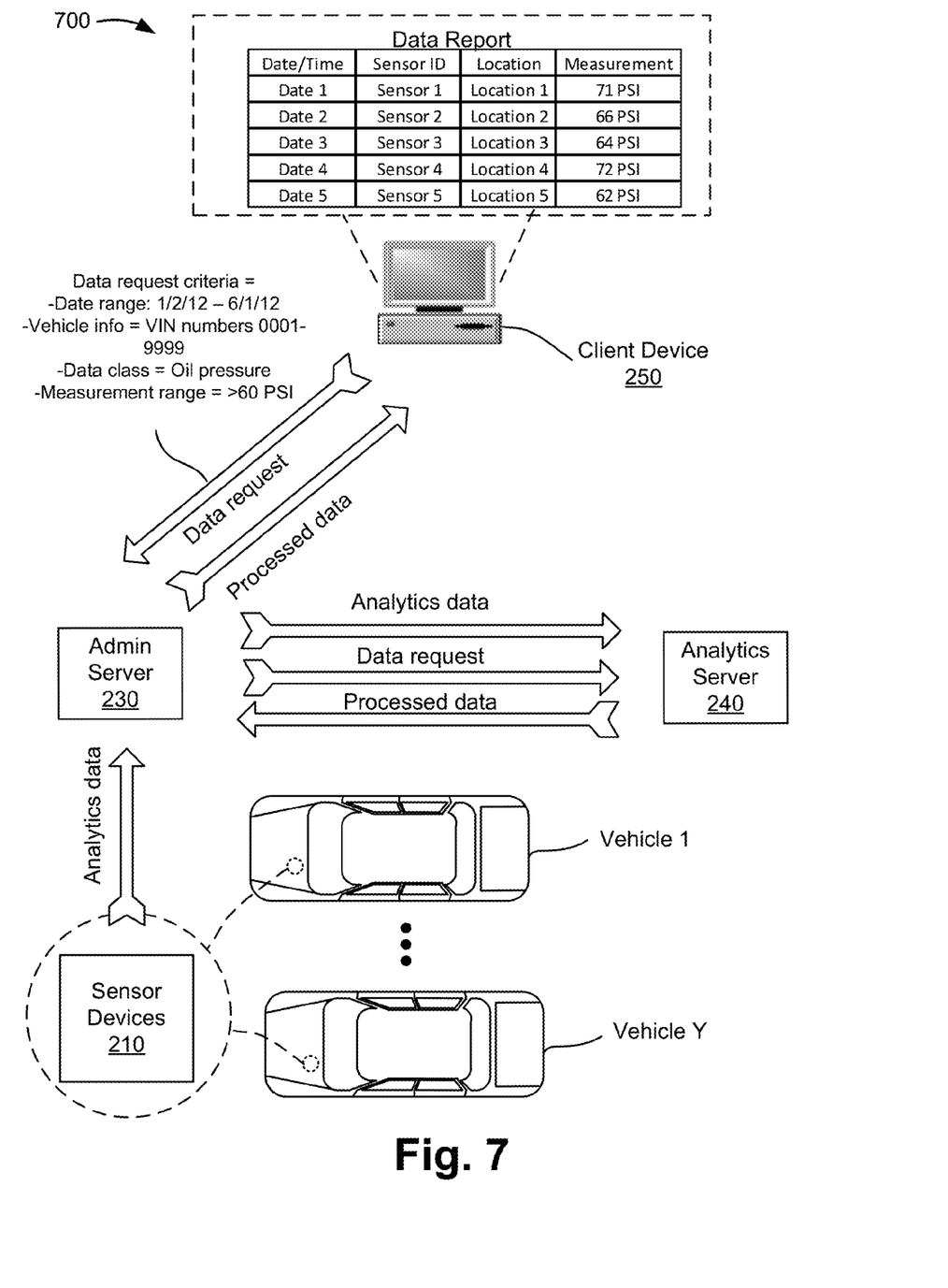

FIG. 7 illustrates an example implementation as described herein. In FIG. 7, assume that multiple sensor devices 210 are implemented within respective multiple vehicles (e.g., vehicles 1 through Y, where Y>1). Further, assume that each sensor device 210 monitors a pressure of a fluid operating in each corresponding vehicle. For example, sensor device 210 may include a fluid pressure sensor to gather fluid pressure data. Additionally, or alternatively, sensor device 210 may interface with a vehicle diagnostic system (e.g., an on-board diagnostic II (OBDII) system, or the like) that includes a fluid pressure sensor and provides fluid pressure data to sensor device 210. As shown in FIG. 7, sensor devices 210 may provide analytics data (e.g., data records with fluid pressure data) to admin server 230.

As shown in FIG. 7 admin server 230 may provide the analytics data to analytics server 240 (e.g., for storage by analytics server 240). In some implementations, client device 250 may provide a data request to admin server 230 to request a report identifying data records that meet particular criteria (e.g., based on input received from a user of client device 250). For example, assume that a user of client device 250 wishes to receive data records meeting particular criteria, such as data records that were gathered during the data range Jan. 12, 2012-Jun. 1, 2012 for vehicles having a VIN within the range 0001-9999, data records associated with an oil pressure data class, and data records having a measurement value of greater than 60 PSI. Given this assumption, the user may input, to client device 250, the particular criteria and may direct client device 250 to provide a data request including the particular criteria to admin server 230. For example, the user may use client device 250 to access a web portal in order to input the particular criteria and to provide the particular criteria to admin server 230.

In some implementations, analytics server 240 may receive the request and may identify data records, stored by analytics server 240 and corresponding to analytics data gathered by sensor device 210, that meet the criteria (e.g., based on preforming a cross-reference search function, as described above) to form processed data. As described above, analytics server 240 may provide the processed data to client device 250. As shown in interface 700, client device 250 may display the processed data in the form of a report having a list of data records meeting the particular criteria.

In some implementations, the report may aid in an analysis, such as a product failure analysis. As an example, assume that a threshold oil pressure of 60 PSI is indicative of a defective component. Given this assumption, the report may identify particular appliances that exceeded this threshold. Further, the report may identify conditions in which the temperature exceeded the threshold (e.g., a geographic location, a shipment batch number, etc.).

While a particular example is shown in FIG. 7, it will be apparent that the above description is merely an example implementation. Other examples are possible and may vary from what is shown and described with respect to FIG. 7. For example, in practice, the report shown in interface 700 may include additional information, less information, or differently arranged information than what is shown.

Figure 8:
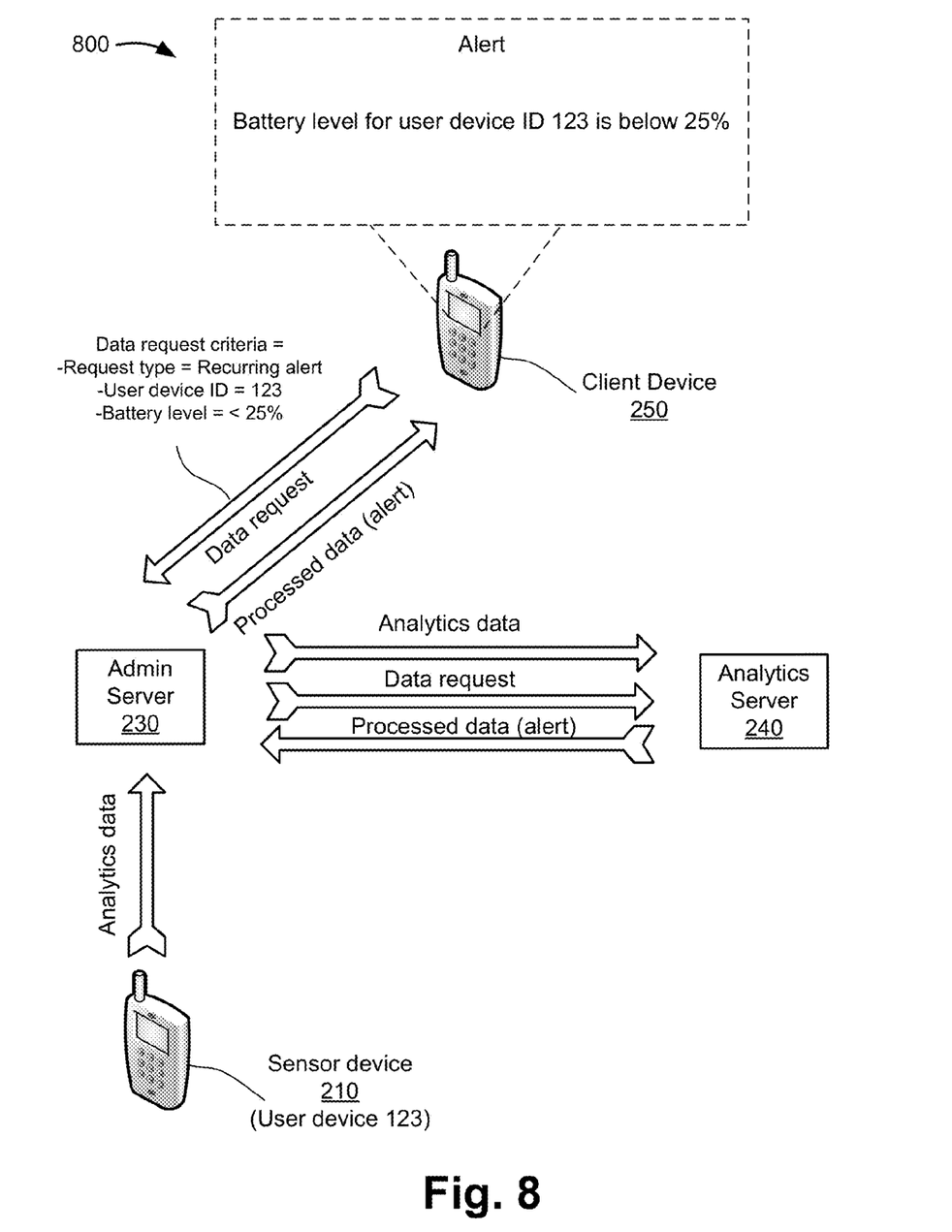

FIG. 8 illustrates an example implementation as described herein. In FIG. 8, assume that sensor device 210 corresponds to a user device, such as a mobile phone having a user device ID of 123. Further, assume that sensor device 210 monitors a battery level of the battery of the mobile phone and provides analytics data (e.g. data records with battery level information) to admin server 230.

As shown in FIG. 8, admin server 230 may provide the analytics data to analytics server 240 (e.g., for storage by analytics server 240). In some implementations, client device 250 may provide a data request to admin server 230 to request an alert identifying data records that meet particular criteria (e.g., based on input received from a user of client device 250). For example, assume that a user of client device 250 wishes to receive an alert for a data record having particular criteria, such as a data record associated with the user device ID of 123, and a data record identifying a battery level of less than 25%. Given this assumption, the user may input, to client device 250, the particular criteria and may direct client device 250 to provide a data request including the particular criteria to admin server 230. As shown in FIG. 8, the data request may also include a request type (e.g., a recurring alert request type).

As shown in FIG. 8, analytics server 240 may receive the data request and may identify a data record that meets the particular criteria. For example, analytics server 240 may store the request for a predetermined time period (e.g., based on information included in the data request that identifies the predetermined time period or based on information identifying a pre-set time period) and may initiate a monitoring function that identifies when a data record, meeting the particular criteria, is captured (e.g., when the sensor device 210, corresponding to the user device having the user device ID 123, identifies that a battery level of sensor device 210 drops below 25% capacity).

In some implementations, analytics server 240 may form processed data (e.g., an alert) based on identifying the data record that meets the particular criteria. Further, analytics server 240 may provide the processed data to client device 250. As shown in interface 800, client device 250 may display the processed data as an alert that identifies that the battery level for user device ID 123 has dropped below 25%. In some implementations, the alert may be used to allow a user of client device 250 to identify when a user device is low on battery power such that the user of client device 250 is advised of the status of the user device. For example, the user of client device 250 may receive the alert such that the user of client device 250 may contact a user of the user device (e.g., a family member, a colleague, etc.) via a technique other than via the user device. In some implementations, the user device may be the same device as client device 250.

While a particular example is shown in FIG. 8, it will be apparent that the above description is merely an example implementation. Other examples are possible and may vary from what is shown and described in FIG. 8.

As described above, analytics server 240 may form processed data having data records that meet particular criteria associated with a data request. In some implementations, the processed data may include a single criterion. For example, assume that the user of client device 250 is associated with a particular manufacturer and that the data request includes a single criterion, such as identification of the particular manufacturer. Given this assumption, client device 250 may receive data records, associated with the particular manufacturer, such that the particular manufacturer may perform data analysis. In some implementations, the processed data may be formed based on a statistical analysis. For example, the processed data may include data records that include measurement values that are outside of a particular number of standard deviations from a mean value.

In some implementations, the processed data may be used to aid in an analysis, such as an analysis of failures of a particular product or system (e.g., when a temperature measurement of a component of the product exceeds a design threshold), an analysis of a driver's driving habits for insurance rating purposes (e.g., based on velocity and acceleration measurements gathered by a sensor device 210 implemented in a vehicle associated with the driver), an analysis of energy usage for energy conservation analysis, and/or some other type of analysis.

In some implementations, processed data may be provided to client device 250 based on a data request. Additionally, or alternatively, processed data may be provided to client device 250 based on a user profile for a user of client device 250. For example, assume that the user profile indicates that the user is interested in a particular subject, such as a particular product. Further, assume that sensor device 210 gathers analytics data regarding the particular product (e.g., analytics data that corresponds to a sales price of the product, analytics data that corresponds to a recall of the product, etc.). Given these assumptions, analytics server 240 may provide processed data to client device 250 even when client device 250 does not request processed data. In some implementations, a user may share the user profile (e.g., on a social network website) and may add interests based on other users' user profiles.

In some implementations, the processed data may be provided to client device 250 via e-mail, via short message service (SMS) texts, via a website, via a file transfer protocol (FTP), via a telephone call, and/or via some other technique. In some implementations, the data request may include a request to receive processed data at regular intervals (e.g. once a day, once a week, once a month, etc.).

As described above, sensor device 210 may be provided in a consumer product such that a manufacturer of the consumer product may receive processed data meeting particular criteria to aid in an analysis. In some implementations, the manufacturer may provide sensor device 210 to a customer of the consumer product in exchange for a payment (e.g., to incentivize the customer to use sensor device 210 such that analytics data, regarding the consumer product, may be gathered). In some implementations, the analytics data may not expose the identity of the customer.

As described above, the analytics data and/or corresponding data records may include a particular priority value. For example, the analytics data may include a priority value lower than a particular threshold such that the analytics data is provided to admin server 230 when network resources, for the priority value of the analytics data, is available. As a result, sufficient network resources may be allocated to data having a priority value higher than the particular threshold and cost may be reduced by providing the analytics data at off-peak times (e.g., when the network resources become available for transmission of the analytics data).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   detecting, by one or more server devices, an amount of available network resources used to transmit data via a service provider network by querying a base station, the amount of available network resources being determined based on network usage at the base station;
   sending, by the one or more server devices and via the service provider network, an indication to a sensor device based on the amount of available network resources,
      the indication identifying when a network resource becomes available for the sensor device to use to provide a plurality of data records via the service provider network by indicating a threshold priority value of data that may be provided using an available network resource,
      the threshold priority value being based on the amount of available network resources determined based on the network usage at the base station to transmit the data via the service provider network;
   receiving, by the one or more server devices and based on the indication sent to the sensor device, the plurality of data records from the sensor device via the service provider network,
      the one or more server devices receiving the plurality of data records based on the network resource being available for use by the sensor device,
      each of the plurality of data records including analytics data collected by the sensor device,
      the analytics data, included in each of the plurality of data records, being associated with a priority value,
      a data record, of the plurality of data records, being received when the priority value, associated with the analytics data included in the data record, satisfies the threshold priority value;
   storing, by the one or more server devices, the plurality of data records;
   receiving, by the one or more server devices and from a client device, a data request for one or more of the plurality of data records meeting particular criteria;
   forming, by the one or more server devices based on receiving the data request, processed data including the one or more of the plurality of data records meeting the particular criteria;
   determining, by the one or more server devices, a payment amount associated with providing the processed data to the client device based on the priority value associated with the analytics data;
   providing, by the one or more server devices, information identifying the payment amount to the client device;
   receiving, by the one or more server devices, payment information corresponding to the payment amount from the client device; and
   providing, by the one or more server devices, the processed data to the client device based on receiving the payment information.

2. The method of claim 1, where the payment amount is based on a quantity of criteria included in the data request, an owner of the plurality of data records, a quantity of data records associated with the processed data, or a time at which the data request is received.

3. The method of claim 1, where the processed data includes a report having a list of the one or more of the plurality of data records.

4. The method of claim 1, where the processed data includes an alert,
   the method further comprising:
      receiving a particular data record meeting the particular criteria after receiving the data request,
   where providing the processed data is based on receiving the particular data record.

5. The method of claim 1, where at least one of the plurality of data records includes:
   a measurement of at least one of: fluid temperature, fluid pressure, battery level, sound, light brightness, acceleration, geographic location, object presence, Bluetooth signal presence, motion, sales activity, electrical power, or energy consumption; and
   a timestamp.

6. The method of claim 1, where each of the plurality of data records include a measurement value,
   the measurement value of each of the one or more of the plurality of data records, associated with the processed data, being greater than a particular number of standard deviations from a mean value of the measurement values of each of the plurality of data records.

7. The method of claim 1, where the data record includes:
   a measurement of at least one of:
      fluid temperature,
      fluid pressure,
      battery level,
      sound,
      light brightness,
      acceleration,
      geographic location,
      object presence,
      Bluetooth signal presence,
      motion,
      sales activity,
      electrical power, or
      energy consumption;
   a timestamp; and
   at least one of:
      user information,
      data class information, or
      product information.

8. The method of claim 1, where the payment amount associated with providing the processed data to the client device for a first priority value is less than for a second priority value,
   the first priority value being less than the second priority value.

9. A system comprising:
   one or more server devices to:
      detect an amount of available network resources used to transmit data via a service provider network by querying at least one base station,
         the amount of available network resources being determined based on network usage of the at least one base station;
      send, via the service provider network, an indication to a plurality of sensor devices based on the amount of available network resources,
         the indication identifying when network resources become available for the plurality of sensor devices to use to provide a plurality of data records via the service provider network by indicating a threshold priority value of data that may be provided using an available network resource,
         the threshold priority value being based on the amount of available network resources determined based on the network usage of the least one base station to transmit the data via the service provider network;

receive, based on the indication sent to the plurality of sensor devices, the plurality of data records from the plurality of sensor devices via the service provider network,
the one or more server devices receiving the plurality of data records based on the network resources being available for use by the plurality of sensor devices,
each of the plurality of data records including analytics data collected by the sensor device,
the analytics data, included in each of the plurality of data records, being associated with a priority value,
a data record, of the plurality of data records, being received when the priority value, associated with the analytics data included in the data record, satisfies the threshold priority value;

store the plurality of data records;
receive, from a client device, a data request for one or more of the plurality of data records meeting particular criteria;
form, based on receiving the data request, processed data including the one or more of the plurality of data records meeting the particular criteria;
determine a payment amount associated with providing the processed data to the client device based on the priority value associated with the analytics data;
provide information identifying the payment amount to the client device;
receive payment information corresponding to the payment amount from the client device; and
provide the processed data to the client device based on receiving the payment information.

10. The system of claim 9, where the payment amount is based on a quantity of criteria included in the data request, an owner of the plurality of data records, a quantity of data records associated with the processed data, or time in which the data request is received.

11. The system of claim 9, where the processed data includes a report having a list of the one or more of the plurality of data records.

12. The system of claim 9, where the processed data includes an alert,
where the one or more server devices are further to:
receive a particular data record meeting the particular criteria after receiving the data request,
where when providing the processed data, the one or more server devices are to provide the processed data based on receiving the particular data record.

13. The system of claim 9, where at least one of the plurality of data records includes:
a measurement of at least one of: fluid temperature, fluid pressure, battery level, sound, light brightness, acceleration, geographic location, object presence, Bluetooth signal presence, motion, sales activity, electrical power, or energy consumption; and
a timestamp.

14. The system of claim 9, where the payment amount associated with providing the processed data to the client device for a first priority value is less than for a second priority value,
the first priority value being less than the second priority value.

15. A non-transitory computer-readable medium for storing instructions, the instructions comprising:
a plurality of instructions which, when executed by one or more processors of at least one server device, cause the one or more processors to:
detect an amount of available network resources used to transmit data via a service provider network by querying at least one base station,
the amount of available network resources being determined based on network usage of the at least one base station;
send, via the service provider network, an indication to a plurality of sensor devices based on the amount of available network resources,
the indication identifying when network resources become available for the plurality of sensor devices to use to provide a plurality of data records via the service provider network by indicating a threshold priority value of data that may be provided using an available network resource,
the threshold priority value being based on the amount of available network resources determined based on the network usage of the least one base station to transmit the data via the service provider network;
receive, based on the indication sent to the plurality of sensor devices, the plurality of data records from the plurality of sensor devices via the at least one base station,
the one or more processors of the at least one server device receiving the plurality of data records based on the network resources being available for use by the plurality of sensor devices,
each of the plurality of sensor devices including one or more sensors to gather analytics data and to form the plurality of data records based on gathering the analytics data,
the analytics data, used to form each of the plurality of data records, being associated with a priority value,
a data record, of the plurality of data records, being received when the priority value, associated with the analytics data used to form the data record, satisfies the threshold priority value;
store the plurality of data records;
receive, from a client device, a data request for one or more of the plurality of data records meeting particular criteria;
form, based on receiving the data request, processed data including the one or more of the plurality of data records meeting the particular criteria;
determine a payment amount associated with providing the processed data to the client device based on the priority value associated with the analytics data;
provide information identifying the payment amount to the client device;
receive payment information corresponding to the payment amount from the client device; and
provide the processed data to the client device based on receiving the payment information.

16. The non-transitory computer-readable medium of claim 15, where each of the plurality of data records include a measurement value,
the measurement value of each of the one or more of the plurality of data records, associated with the processed data, being greater than a particular number of standard deviations from a mean value of the measurement values of each of the plurality of data records.

17. The non-transitory computer-readable medium of claim 15, where the processed data includes a report having a list of the one or more of the plurality of data records.

18. The non-transitory computer-readable medium of claim 15, where the processed data includes an alert,
where the plurality of instructions further cause the one or more processors of the at least one server device to:
receive a particular data record meeting the particular criteria after receiving the data request,
where one or more instructions, of the plurality of instructions, to provide the processed data, further cause the one or more processors of the at least one server device to provide the processed data based on receiving the particular data record.

19. The non-transitory computer-readable medium of claim 15, where the data record includes:
a measurement of at least one of:
fluid temperature,
fluid pressure,
battery level,
sound,
light brightness,
acceleration,
geographic location,
object presence,
Bluetooth signal presence,
motion,
sales activity,
electrical power, or
energy consumption;
a timestamp; and
at least one of:
user information,
data class information, or
product information.

20. The non-transitory computer-readable medium of claim 15, where the payment amount associated with providing the processed data to the client device for a first priority value is less than for a second priority value,
the first priority value being less than the second priority value.

* * * * *